(12) United States Patent
Boyaci et al.

(10) Patent No.: US 8,695,528 B2
(45) Date of Patent: Apr. 15, 2014

(54) INTELLIGENT TEMPERATURE INDICATOR LABEL AND METHOD

(75) Inventors: Ismail Hakki Boyaci, Ankara (TR); Ozlem Torun, Ankara (TR); Beril Ozbalci, Ankara (TR)

(73) Assignee: Sanko Tekstil Isletmeleri Sanayi ve Ticaret A.S., Gaziantep (TR)

( * ) Notice: Subject to any disclaimer, the term of this patent is extended or adjusted under 35 U.S.C. 154(b) by 352 days.

(21) Appl. No.: 13/200,859

(22) Filed: Oct. 4, 2011

(65) Prior Publication Data

US 2013/0081566 A1    Apr. 4, 2013

(51) Int. Cl.
*G01K 3/04*   (2006.01)
*G01K 11/12*  (2006.01)

(52) U.S. Cl.
USPC ............................ 116/216; 374/106; 374/162

(58) Field of Classification Search
USPC ........... 116/207, 216, 217; 374/106, 161, 162
See application file for complete search history.

(56) References Cited

U.S. PATENT DOCUMENTS

| | | | |
|---|---|---|---|
| 2,671,028 A | | 3/1954 | Clark |
| 3,822,189 A | * | 7/1974 | Tornmarck ...................... 435/12 |
| 3,977,945 A | * | 8/1976 | Tornmarck ...................... 435/20 |
| 3,997,945 A | | 12/1976 | Robins |
| 4,043,871 A | * | 8/1977 | Blixt et al. ...................... 435/19 |
| 4,184,920 A | * | 1/1980 | Blixt et al. ...................... 435/19 |
| 4,729,671 A | * | 3/1988 | Asano et al. ................... 374/160 |
| 4,826,762 A | | 5/1989 | Klibanov et al. |
| 7,430,982 B2 | * | 10/2008 | Koivukunnas et al. ....... 116/219 |

FOREIGN PATENT DOCUMENTS

| | | | | |
|---|---|---|---|---|
| CN | 201964968 U | * | 9/2011 | ............... G01K 3/04 |
| JP | 60190826 A | * | 9/1985 | ............. G01K 11/06 |
| TR | 2007 06666 B | | 9/2007 | |
| WO | WO 92/05415 | | 4/1992 | |
| WO | WO 2006/015961 A2 | | 2/2006 | |
| WO | WO2007/047357 | | 4/2007 | |

OTHER PUBLICATIONS

International Search Report of PCT/IB2012/001855, mailed on Oct. 31, 2013, 3 pages.
Written Opinion of PCT/IB2012/001855, mailed Oct. 31, 2013, 4 pages.

* cited by examiner

*Primary Examiner* — R. A. Smith
(74) *Attorney, Agent, or Firm* — Finnegan, Henderson, Farabow, Garrett & Dunner, LLP

(57) ABSTRACT

A release of the frozen solvent trapped inside a solidified gel occurs when the temperature increases, followed by a dissolving of a reactive substance present in a membrane that is located in direct physical contact with the gel, resulting in the reabsorption of the reactive substance dissolved in the solvent into the solid gel layer within a constant time. In this manner, the components generating color change come together within the solid gel layer initiating a reaction to change the color of the indicator layer. Thus, the increase in temperature above a melting point of the solid gel layer is enough to activate the intelligent label with an irreversible color change.

23 Claims, 1 Drawing Sheet

INTELLIGENT TEMPERATURE INDICATOR LABEL AND METHOD

FIELD OF THE INVENTION

The present invention relates to an intelligent label that is in contact with a package to show the temperature history of that package. For example, in one embodiment of the invention, a defrost indicator is provided for items, such as food or medical products that must be frozen during storage, that indicates that an above-freezing temperature has been reached at some point in time, even if the item is then again subjected to refreezing. In another embodiment, a time-temperature indicator provides traceability of the time-temperature history of items, such as food or medical products. Thus, with either embodiment, an indicator is provided of the temperatures to which products have been subjected from production to consumption through all stages of storage, shipping, and handling. This is particularly helpful for customers and producers of products with restricted shelf lives, such as perishable foods and drugs.

BACKGROUND OF THE INVENTION

Expiration dates of chemicals, drugs, and food products, which spoil over the course of time and have limited shelf lives, are determined to assure healthy usage. However, storage conditions of these products extremely affect their shelf lives. Products stored in unfavorable conditions spoil in a shorter time.

Different indicators for determining the storage conditions of products with limited shelf life are known. For example, some known intelligent temperature indicators are based on enzymatic or polymerization reactions and/or diffusion. In addition, radio frequency identification-time-temperature indicators (RFID-TTIs) exist.

An enzymatic time-temperature indicator, which has been improved by using alkaline phosphatase, is described in WO 9205415. In this method, the solution is colorless before the enzymatic reaction, whereas it gets yellow after the reaction occurs. In the aforementioned method, the color change to yellow cannot be monitored easily, so large amounts of indicator solution need to be used. Also, a carrier is used. These two factors increase the cost of production.

Another example related to known techniques is explained in WO 2006015961. Here, a time-temperature indicator is improved by using immobilized enzymes. Usage of immobilized enzymes causes some disadvantages, which include difficulties in measurements of immobilized enzyme activity, extra costs for immobilization, and the possibility of a decrease in immobilized enzyme activity during a prolonged storage period.

A time-temperature indicator described in U.S. Pat. No. 3,977,945 is based on the principle of fatty acid production from lipids by lipase activity resulting in a color change as a result of a decrease in pH. In this system, enzymes are captured in a matrix. Enzymes in the matrix system have lower activity than free enzymes. To increase the activity of enzymes in the matrix, enzymes must be used in larger quantities. This causes an increase in indicator cost.

A time-temperature indicator based on an enzymatic reaction has been disclosed in U.S. Pat. No. 4,826,762. Enzymes and other materials are dissolved in an organic solvent, which has a constant melting point. A disadvantage of this method is an indicator that is ineffective for temperatures under the melting point of the solvent but high enough to cause spoilage. Hexadecane is used as a solvent in the given example. When the temperature of the indicator is elevated above 18.2° C., the solid organic solvent melts, enzymatic reaction occurs, and the color of the indicator changes. However, the organic solvent becomes solid when exposed to temperatures below 18.2° C. Thus, food products that spoil when stored below 18.2° C. will not be identified.

Another enzymatic time-temperature indicator based on color change is described in U.S. Pat. No. 2,671,028. In this system, color changes as a result of reaction. Although an increase in temperature leads to an increase in the rate of color change, this indicator is inactive for temperatures that are not suitable for the storage of certain food products.

Still another intelligent label approach is disclosed in Turkish Patent No. TR 2007 0666B.

In general, commonly known intelligent labels have a problem of uncontrollable rapid color change, and require a physical barrier to keep the reactive components separated. To cure the above-identified problems, the present invention is generally directed to intelligent labels in which the color change can be controlled, and which do not require a physical barrier for separation of the reactive components.

SUMMARY OF THE INVENTION

An intelligent label for use as a temperature indicator is provided comprising a gel layer and a membrane layer in physical contact with one another, wherein: (a) the gel layer comprises a coloring agent and a solvent that are held in place in the gel layer when the gel layer is below a certain temperature; (b) the solvent is released to outside the gel layer above the certain temperature; (c) the membrane layer includes a membrane and a substance absorbed in the membrane that is dissolved by the solvent upon release of the solvent from the gel layer; and (d) the dissolved substance diffuses within the gel layer and reacts with the coloring agent in the gel layer to thereby indicate a change in temperature above the certain temperature.

As used herein, the term "gel layer" is to be broadly construed to include any physical form that a gel capable of holding a solvent at low temperatures can take on, and is not limited to the flat "layer" shown in the illustrative drawings. Likewise, the term "solid" or "solidified" is to be broadly construed when modifying the "gel layer" to mean sufficiently thickened to permit holding of a solvent and low temperatures, such as the temperature water freezes at, and sufficiently thickened to permit holding of the additional components disclosed and being included in the gel at temperatures above which the solvent is released from the gel.

In one preferred embodiment, the substance absorbed in the membrane is an enzyme that can be dissolved in the solvent when the intelligent label is used to indicate both the degree of rise in temperature over a given level and the time the product is exposed above that given temperature (referenced to herein as a "time-temperature indicator"). In this case, the solvent is preferably a buffer solution, and the enzyme is dissolved in the buffer solution upon release of the buffer solution from the gel layer.

The gel layer preferably includes a substrate, and the dissolved enzyme reacts with the substrate upon diffusion of the dissolved enzyme in the gel layer to form a substrate-enzyme reaction, and the coloring agent preferably is a dye that reacts with the substrate-enzyme reaction to change to a color as a function of both temperature above the certain temperature and time exposure above the certain temperature.

The reaction with the coloring agent is preferably not reversible.

In an alternative embodiment, the intelligent label is used as a defrost indicator. In this case, the substance absorbed in the membrane is preferably an acid, base, activator, or quencher that, when dissolved in the solvent and diffused in the gel layer, reacts with the coloring agent in the gel layer to indicate exposure to a temperature above the certain temperature.

The certain temperature may be the freezing temperature of water. Again, preferably, the reaction with the coloring agent is not reversible.

A method for color change in an intelligent label is also provided, comprising the steps of: (a) holding a solvent inside a gel layer when the gel layer is held below a certain temperature; (b) releasing a solvent from the solid gel layer when the gel layer is above the certain temperature; (c) exposing the released solvent to a reactive absorbed membrane layer that is in physical contact with the gel layer and includes a membrane and a substance absorbed in the membrane that is dissolved by the solvent upon release of the solvent from the gel layer; (d) absorbing the dissolved substance into the gel layer; and (e) initiating a color change in the solid gel layer as a result of movement of the reactive substance into the gel layer during the step of absorbing.

The indicator is preferably kept frozen until use and the color change is not reversible.

In still other words, a time and temperature-dependent enzymatic indicator device is provided that includes: (a) a solidified gel layer containing (i) a solvent and a substrate, (ii) a thickener agent to capture the solvent and substrate in the gel layer, and (iii) a dye solution that changes color through enzymatic reaction; (b) an absorbent membrane layer in contact with the gel layer, either directly or through a membrane that is not temperature-sensitive, such as paper, wherein at least one type of enzyme capable of being acted upon by the substrate is absorbed; (c) a multilayered isolation material enclosing and protecting the gel layer and membrane layer, wherein the rate of enzymatic reaction, and therefore the rate of color change, depends on temperature and time due to enzymatic reaction when the solvent is released from the gel layer due to temperature, the released solvent dissolves enzymes from the membrane layer, and the dissolved enzyme is diffused into the gel layer.

In still another illustrative, nonlimiting embodiment, the intelligent label of the present invention comprises six layers that include a solidified gel layer, a reactive absorbed membrane layer, a multilayered isolation material, a protective layer, a color scale, and duct tape. Two of these layers (the solidified gel layer and the reactive absorbed membrane layer) form indicator material, and the others provide isolation, protection, and ease of transport. The multilayered isolation material and the protective layer protect the indicator material from damage, maintain stability of the indicator material, and prevent leakage. The reactive absorbed membrane layer has a reactive substance absorbed therein. As an exemplary embodiment, the indicator material has three components that are involved in color change, i.e., the solvent, the coloring agent (including a substrate when the reactive substance is an enzyme), and the reactant. In an illustrative, nonlimiting embodiment, the color change is achieved by release of the solvent from the solidified gel layer upon an increase in temperature; the dissolution of the reactive substance present in the membrane; diffusion of the reactive substance dissolved in the solvent to the solidified gel layer, which contains the coloring agent/substrate; and reaction of the reactant with the coloring agent/substrate to produce a color change.

BRIEF DESCRIPTION OF THE DRAWINGS

Aspects of illustrative, nonlimiting embodiments of the present invention will become more apparent by describing in detail embodiments thereof with reference to the attached drawings, in which.

DESCRIPTION OF THE EMBODIMENTS

Reference will now be made in detail to exemplary embodiments of the present invention, examples of which are illustrated in the accompanying drawings. Whenever possible, the same reference numbers will be used throughout the drawings to refer to the same or like parts.

In the following description, for purposes of explanation and not limitation, specific techniques and embodiments are set forth, such as particular sequences of steps, interfaces, and configurations, in order to provide a thorough understanding of the techniques presented here. While the techniques and embodiments will primarily be described in the context of the accompanying drawings, those skilled in the art will further appreciate that the techniques and embodiments can also be practiced in other electronic devices or systems.

Figure 1:
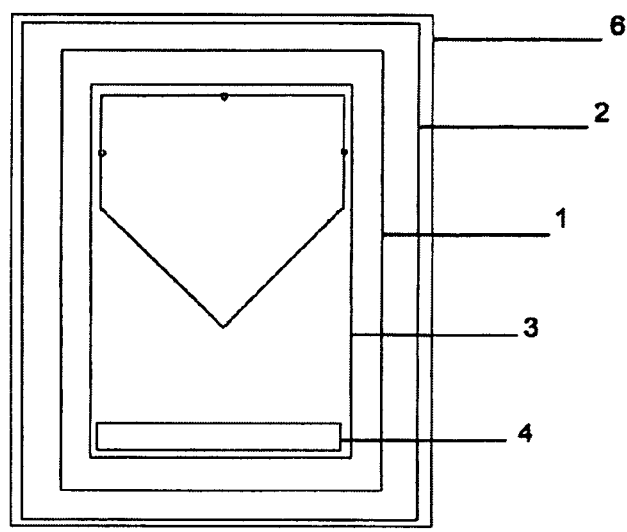
FIG. 1 is a perspective view of an intelligent label.
Figure 2:
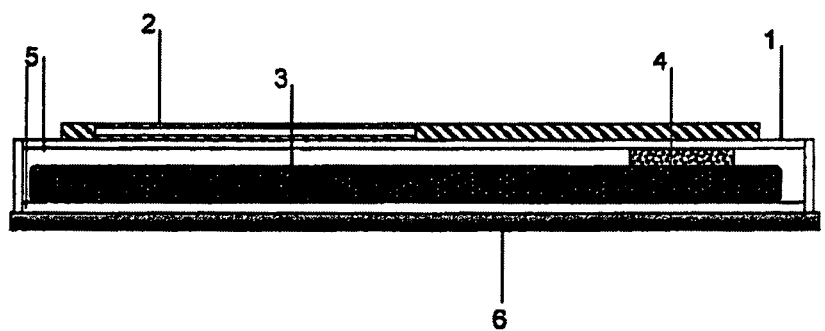
FIG. 2 is a side view of the intelligent label of FIG. 1.

An exemplary embodiment of the intelligent label is illustrated in FIGS. 1 and 2. FIG. 1 is a perspective view of an intelligent label showing a solidified gel layer 3 and a reactive absorbed membrane layer 4. FIG. 2 is a side view of the intelligent label showing the solidified gel layer 3, the reactive absorbed membrane layer 4, a protective layer 1, a color scale 2, an isolation material 5 on both the top and bottom of the label, and a duct tape 6. The solidified gel layer 3 and the reactive absorbed membrane layer 4 are responsible for the color change in the intelligent label, while the protective layer 1 and the isolation material 5 are used to protect the two layers that are responsible for the color change, and for labeling the product with the intelligent label. The number of layers can be reduced or increased according to the type of product.

The solidified gel layer 3 is designed to control the diffusion of the reactive substance necessary for the color change, as well as the following functions: (a) holding the solvent inside the structure under freezing conditions; (b) releasing a certain amount of solvent from the solidified gel layer upon melting; (c) absorbing dissolved substance from the membrane; (d) providing proper media so that the reactive substance will diffuse through the solid gel layer; and (e) initiating the color change as a result of the movement of the reactive substance into the solidified gel layer. The rate of the reaction is proportional to the rate of the diffusion.

With this purpose, the formation of the solidified gel layer 3 is achieved by dissolving a thickener agent; adding a coloring agent, solvent, and substances used for the reabsorption of the solvent upon release; and rigidifying the complex. Exemplary embodiments of the thickener agent include gelatin, pectin, starch, or agar with a suitable solvent. Water is an exemplary embodiment of the solvent, as is alcohol.

The solidified gel layer 3 is then put together in a suitable conformation with the reactive absorbed membrane layer 4, which are preferably in direct contact with one another without any interposed barrier layer. As shown, the reactive absorbed membrane layer 4 may be of smaller dimensions than the solidified gel layer 3. Both the reactive absorbed membrane layer 4 and the solidified gel layer 3 are surrounded by the isolation material 5, which may be multilayered. The multilayered isolation material 5 prevents the passage of fluids and is thin, nonreactive with the label material, and transparent so as not to block visual tracking. Moreover, the label material coated with the multilayered isolation material 5 may have duct tape 6 on one side for ease of attachment to a food, drug, or similar package. The protective layer 1 provides strong protection and prevents leakage of the label material outside the isolation material 5. Duct tape 6 serves the purpose of attaching the label to the packaged product. The color scale 2 is positioned directly on top of the protective layer 1, and the colors on the color scale 2 indicate the gradual change in color as a function of time.

Upon color change in the solidified gel layer 3, the color of the label can be compared with the color scale 2 positioned directly on top of the isolation material 5. As long as the color of the label is the same as the color at the beginning of the color scale 2, i.e., the first color or an intermediate color on the color scale 2, the product can be consumed safely. However, if the color of the label is the same as the color at the end of the color scale 2, i.e., the last color, the color indicates the end of the reaction time, and the product is not suitable for consumption.

Defrost Indictor Embodiment

An exemplary embodiment of the invention is a defrost indicator. The coloring agent used in the defrost indicator may be alizarine.

In this embodiment, the reactive absorbed membrane layer 4 contains a reactive substance absorbed on a membrane at quantified amounts that can diffuse into the solidified gel layer 3 and react with the coloring agent held in the solidified gel layer 3.

Exemplary embodiments of the reactive substance include acids, bases, activators, and quenchers, and exemplary embodiments of the membrane material include silica-coated layer substances, paper, and cotton.

By using different types of reactive substances and additional agents that interact with the reactive substance, variation in the color change can be achieved. Exemplary embodiments of the coloring agent used in the defrost indicator include pH indicators, dyes that change color in a chemical reaction, and metal complex dyestuffs. Exemplary embodiments of the substrate responsible for the color change include also acids, bases, activators, and quenchers.

Another method for obtaining different time intervals of color change is to alter the solid gel formulations and absorbed amounts of the reactive substance. Based on the benefits of these modifications, defrost indicators can be produced for a huge variety of products with different melting properties.

In the above exemplary embodiment, the product and the indicator are kept frozen together. The defrost indicator is produced by putting the reactive absorbed membrane layer 4 on the solidified gel layer 3 in a suitable conformation, covering these two layers with the packaging material, and storing below a freezing temperature. The defrost indicator is stable under frozen conditions and a color change does not occur.

After the above steps are carried out, the defrost indicator is ready to use, and is stored in a frozen condition in order to prevent any possible undesirable color change before use. The defrost indicator is attached to a package of frozen food or a medical product in a frozen state when it is used, and is provided with a color scale positioned on the packaging material to allow the user to determine whether color change has occurred in the defrost indicator. The exposure of the indicator material to temperatures above the melting temperature of the food or medical product results in a change in the color of the gel layer. This change may be dependent on the time that the temperature is above freezing, for example, indicating a 0.5 to 5 hour exposure to thawing temperatures. The color change may not, however, be dependent on the degree by which the temperature rises above freezing.

Alizarine is an acid/base sensitive pH indicator. The color of alizarine is yellow in an acidic medium and red in a basic medium. When the gel layer (including alizarine) is prepared with a base, its color is red. When the reactant is an acid and the discolved reactant diffuse through the gel layer, a color change occurs and the final color is yellow.

In summary, the initiation of color change occurs with the increase of environment temperature above the melting point leading to the meltdown and the release of a specific amount of solvent held in the solidified gel layer. The released solvent dissolves the reactive substance absorbed to the membrane layer and the reactive substance passes through the solution phase. In a short time, this solution is retaken by the solidified gel layer, so the reactive substance passes to the solidified gel layer. The reactive substance diffuses through the solidified gel layer and, as a result, the color reaction occurs. The rate that the reaction is proportional to the rate of the diffusion can be changed by the structure of the solidified gel layer and the use of molecules in the gel that affect diffusion. The amount and/or type of the substances used as thickener (e.g., starch, gum, pectin, protein) alter the rate of the diffusion based upon the rigidity of the gel.

Unlike in prior fluid systems where the reactive and colored components are separated by a physical barrier, the need for such a barrier has been eliminated in the practice of the present invention. Therefore, the color change is not generated by the destruction of the physical barrier according to the reactive-colored component mixture. The need for a physical barrier is precluded through the invention, therefore providing a lower cost of production.

In other words, the release of the frozen solvent inside the solidified gel layer with temperature increase is followed by the controllable solution of the reactive substance, and within a constant time, retaking of the solvent with the dissolved reactive substance is achieved. By this method, the components generating color change come together, initiating a reaction that causes color change. As a result, the increase of temperature above the melting point is enough for the activation of the defrost indicator.

The color change period can be set as desired, so that defrost indicators for usage in the production of different sized and qualified products are achieved.

The color change takes place according to the time the label, and hence the product attached to the label, is kept under undesirable conditions.

By comparing the indicator color with the reference color scale, consumers are informed about the exposure of the product to thawing conditions.

The label is not in contact with the product, thereby reducing risk of product contamination.

Time-Temperature Indicator Embodiment

Another exemplary embodiment of the invention is the time-temperature indicator. The reactive absorbed membrane layer 4 of the time-temperature indicator contains a reactive enzyme substance absorbed on a membrane at quantified amounts that can react with a substrate held in the solidified gel layer 3 and diffuse through the gel layer. Preferably, the reactive enzymes are hydrolases. To create the gel layer, the substrate and a dye solution that can interact with the substrate to generate a change in color are both dissolved in an appropriate buffer followed by a solidifying step, wherein the solution is mixed with a thickener agent. An exemplary embodiment of the dye solution is iodine.

In the time-temperature intelligent label, the absorbent membrane holds the enzymes. As the gel layer rises above freezing, the solvent in the gel layer is released and acts to dissolve the enzymes in the membrane. The dissolved enzymes are diffused into the gel layer and therefore interact with the substrate to result in "a substrate-enzyme reaction." This "substrate-enzyme reaction" then interact with the color agent. As a result of the enzymatic reaction, visual differentiation occurs due to the change in the properties of the dye solution.

This change of visual appearance is directly affected by the degree of temperature change. A large temperature increase, such as a rise to room temperature, shortens the time required for the reaction to reach completion, resulting in visual conversion, whereas a rise to refrigerated temperatures results in a much slower reaction.

Examples of the parameters strongly affecting enzyme kinetics include the purity of the enzyme, the concentration, the type of buffer used, its pH, and its molarity. Specific reaction rates for specific products may be arranged by modulating the parameters listed above. The parameter values, and the corresponding reaction rates, are optimized based on the shelf life of the products and the appropriate storage temperature. To gain maximum sensitivity to temperature and time, labels are developed to be highly affected by the change in reaction rate due to a change of these parameters. The effect of light, interactions with packaging material, toxicity to food in case of contamination, and other defects that may cause disadvantages need also be considered.

The color change takes place through stages, based on the value and the rate of the temperature increase that the product is exposed to. This effect provides traceability of the time that the product is exposed to undesirable conditions. The resultant color changes are not reversible. Thus, by comparing the indicator color with the reference color scale, consumers are informed about the time-temperature history of products to which the labels are attached. The label is not in direct contact with the product due to the presence of the multilayered isolation material, but in any event, there is no risk of contamination.

Here, the color change occurs depending on temperature and time. The reaction rate, and therefore the time elapsed through color change, is determined directly by the temperature of the environment and the time spent in those conditions.

The label material can be safely stored until use under frozen conditions. In this way, the reaction rate can be restrictedly controlled before activation. After placing the label on the product, it starts melting, and initiation of the reaction, and thus color change, takes place.

Through the preparation processes, the modulations of content parameters enable the stabilization of the reaction rate for specific products. Also, by changing the ratio of substrate to enzyme, the amount of time that must elapse for the color of the label to change can be set properly.

The color change of the label material is irreversible. Once the food product has been kept under undesirable conditions for a suffiently long time, the label can reach the last color on the color scale, even before the shelf life of the product expires. From this moment forward, even if the environment conditions are set accurately after the color change has been completed, the label will remain stable at the last color, therefore avoiding misdirection. Lowering the temperature below determined values for storage will not make a difference on the result but will affect the reaction rate, unless stopped by freezing.

Color changes of labels are set subject to the shelf life of the products announced in the literature. The shelf life of foods stored under undesirable temperatures shortens, leading to the risk of spoilage. In the presence of spoilage risk, the intelligent labels complete color change. This protects the consumer from buying spoiled products before shelf life is over.

The label is not in contact with the product, so once again, the risk of contamination is low.

The use and tracking of the labels are easy, and the production is cost effective. The components composing the label material are used in low concentrations and amounts, providing low cost production.

The ability to produce labels in a wide variety of geometric shapes makes them practical to use.

EXAMPLES

Defrost Indicator Example

In one exemplary embodiment of the defrost indicator, the solid gel layer includes alizarine as a pH indicator, which also behaves as a dye substance. The reactive absorbed membrane layer contains an acid solution. The acid solution dissolves in the solvent released by the solidified gel layer upon melting, and is reabsorbed into the solidified gel layer, resulting in a change in the color of the solidified gel layer. The color change in the defrost indicator is due to the exposure of the alizarine to acidic conditions.

Time-Temperature Indicator Example

In one exemplary embodiment of the time-temperature indicator, the solidified gel layer includes glucose as the substrate, phenolphthalein as the dye solution, a buffer, and agar as the thickening agent. The enzyme present in the reactive absorbed membrane layer is a glucoseoxidase, which is dissolved in the solvent released by the solidified gel layer upon melting. The glucoseoxidase solution is reabsorbed by the solidified gel layer, and the pink color of the basic complex present in the solidified gel layer is decolorized by the action of glucoseoxidase, which produces gluconic acid.

The foregoing description has been presented for purposes of illustration. It is not exhaustive and does not limit the invention to the precise forms or embodiments disclosed. Modifications and adaptations of the invention can be made from consideration of the specification and practice of the disclosed embodiments of the invention. For example, one or more steps of methods described above may be performed in a different order or concurrently and still achieve desirable results.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. An intelligent label for use as a temperature indicator comprising a gel layer and a membrane layer in physical contact with one another, wherein:
   the gel layer comprises a coloring agent and a solvent that are held in place in the gel layer when the gel layer is below a certain temperature;

the solvent is released to outside the gel layer above said certain temperature;

the membrane layer includes a membrane and a substance absorbed in the membrane that is dissolved by said solvent upon release of said solvent from said gel layer; and the dissolved substance diffuses within the gel layer and reacts with the coloring agent in the gel layer to thereby indicate a change in temperature above said certain temperature.

2. The intelligent label of claim 1, wherein said substance absorbed in said membrane is an enzyme that can be dissolved in said solvent and wherein said solvent is a buffer solution and said enzyme is dissolved in said buffer solution upon release of said buffer solution from said gel layer.

3. The intelligent label of claim 2, wherein said gel layer includes a substrate and said dissolved enzyme reacts with said substrate upon diffusion of said dissolved enzyme in said gel layer to form a substrate-enzyme reaction.

4. The intelligent label of claim 3, wherein said coloring agent is a dye that reacts with said substrate-enzyme reaction to change to a color as a function of both temperature above said certain temperature and time exposure above said certain temperature.

5. The intelligent label of claim 3, including media for the diffusion of the dissolved enzymes into the gel layer.

6. The intelligent label of claim 2, used as a time-temperature indicator for temperature sensitive products.

7. The intelligent label of claim 1, wherein said substance absorbed in said membrane is an acid, base, activator, or quencher that, when dissolved in the solvent and diffused in the gel layer, reacts with the coloring agent in the gel layer to indicate exposure to a temperature above said certain temperature.

8. The intelligent label of claim 7, used as a defrost indicator for temperature-sensitive products.

9. The intelligent label of claim 1, wherein said reaction with the coloring agent is not reversible.

10. The intelligent label of claim 1, wherein said certain temperature is the freezing temperature of water.

11. The intelligent label of claim 1, wherein a non-temperature-sensitive barrier is located between said gel layer and said membrane.

12. A method for color change in an intelligent label comprising the steps of:

holding a solvent inside a gel layer when said gel layer is held below a certain temperature;

releasing solvent from the solid gel layer when said gel layer is above said certain temperature;

exposing said released solvent to a reactive absorbed membrane layer that is in physical contact with said gel layer and includes a membrane and a substance absorbed in the membrane that is dissolved by said solvent upon release of said solvent from said gel layer;

absorbing the dissolved substance into said gel layer; and initiating a color change in the solid gel layer as a result of movement of the reactive substance into the gel layer during the step of absorbing.

13. The method of claim 12, wherein said substance absorbed in said membrane is an enzyme that can be dissolved in said solvent and wherein said solvent is a buffer solution and said enzyme is dissolved in said buffer solution upon release of said buffer solution from said gel layer.

14. The method of claim 13, wherein said gel layer includes a substrate and said dissolved enzyme reacts with said substrate upon diffusion of said dissolved enzyme in said gel layer to form a substrate-enzyme reaction.

15. The method of claim 13, wherein the rate of enzymatic reaction, and therefore the rate of color change, depends on temperature and time due to enzymatic reaction when said solvent is released from the gel layer due to temperature, the released solvent dissolves enzymes from the membrane layer, and the dissolved enzyme is diffused into the gel layer.

16. The method of claim 13, wherein said coloring agent is a dye that reacts with said substrate-enzyme reaction to change to a color as a function of both temperature above said certain temperature and time exposure above said certain temperature.

17. The method of claim 13, including media for the diffusion of the dissolved enzymes into the gel layer.

18. The method of claim 13, used as a time-temperature indicator for temperature-sensitive products.

19. The method of claim 12, wherein said substance absorbed in said membrane is an acid, base, activator, or quencher that, when dissolved in the solvent and diffused in the gel layer, reacts with the coloring agent in the gel layer to indicate exposure to a temperature above said certain temperature.

20. The method of claim 19, used as a defrost indicator for temperature-sensitive products.

21. The method of claim 12, wherein said reaction with the coloring agent is not reversible.

22. The method of claim 12, wherein said gel layer includes a thickener.

23. The method of claim 12, wherein said certain temperature is the freezing temperature of water.

* * * * *